T. R. COOK.
DRAFT-EQUALIZER.

No. 194,075. Patented Aug. 14, 1877.

Attest:
J. P. Calvert.
John H. Rusit

Inventor
Thomas R. Cook.

UNITED STATES PATENT OFFICE.

THOMAS R. COOK, OF MOORESVILLE, INDIANA.

IMPROVEMENT IN DRAFT-EQUALIZERS.

Specification forming part of Letters Patent No. 194,075, dated August 14, 1877; application filed June 28, 1877.

*To all whom it may concern:*

Be it known that I, THOMAS R. COOK, of Mooresville, in the county of Morgan and State of Indiana, have invented a new and Improved Draft-Equalizer, of which the following is a specification:

The object of my invention is to so regulate the draft that each horse may have the proportion of the load designed for him to draw.

Figure 1:
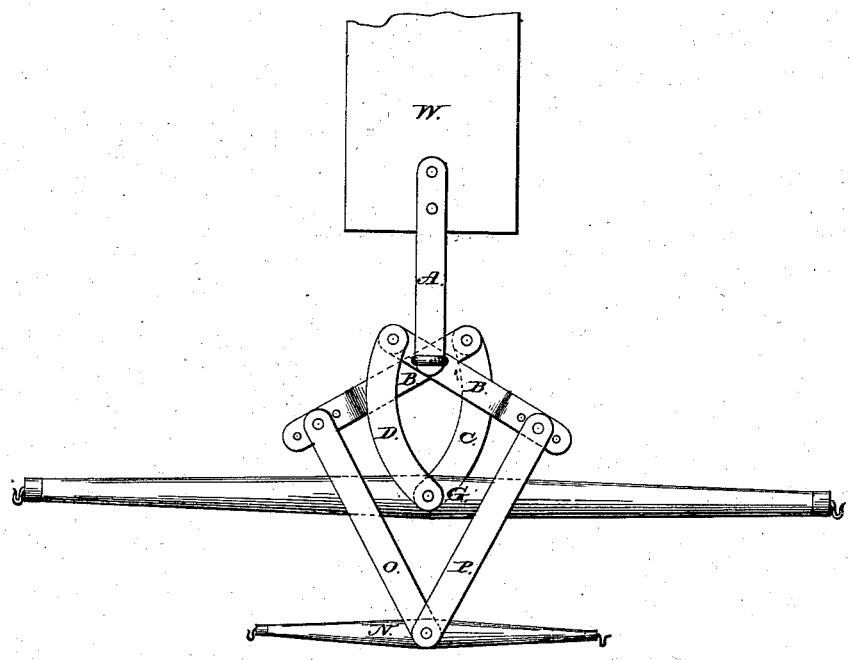

Referring to the drawing, B B, Fig. 1, are two levers, which are attached to the object, W, to be drawn by a clevis, A, in the usual way, the clevis-pin passing through the two levers B B. The levers B B are arranged at right angles to the line of draft, the short end of one on the right, and the short end of the other on the left. The short end of the lower lever is connected to the lower side of the main bar G at its center by a strap, C, or by a bolt or otherwise, the short end of the upper lever B being connected in the same way by the strap D to the upper side of the main bar G, also at its center.

The long end of each lever B B is bent upward, then outward parallel to the lower part of same, for convenient attachment to the whiffletree N, the long end of the lower lever being connected to the lower side of the whiffletree N at its center by a strap, O, or by a bolt or otherwise, the long end of the upper lever being connected to the upper side of the whiffletree N in the same way by the strap P.

The whiffletree N is placed above and forward of the main bar G, as shown in Fig. 1. At the long ends of the levers B B are holes arranged so that the ends of the straps O P connected with each lever may be moved either toward or from the clevis-pin, the proportion of the weight W to be overcome by either of the levers being thus increased or diminished at will.

The comparative length of the straps O P to the length of the straps C D should be such that when the two levers B B are at right angles to the line of draft the three whiffletrees are in line with each other. A whiffletree is attached to each end of the main bar G, and may be moved toward or from the center to increase or lessen the proportion of the load drawn by the animal attached thereto. The whiffletrees are attached to the traces in the usual way.

Figure 2:
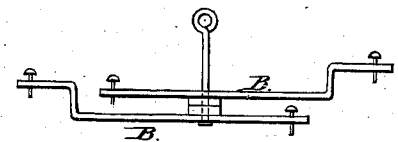

Fig. 2 is a side view of the levers B B.

The advantages claimed for my improved draft-equalizer are, that it can be readily adjusted to distribute the proportion of the load to each horse it is intended for him to draw; that it permits the easy movement of each horse, and may be arranged for two horses by detaching the levers and straps, and passing the clevis-pin through the main bar at its center.

Having thus described my invention, I claim as new and desire to secure by Letters Patent—

The combination of the two levers B B, straps C D O P, main bar G, and whiffletree N, substantially as herein shown and described.

THOMAS R. COOK.

Witnesses:
  J. P. CALVERT,
  JOHN H. RUSIC.